(12) United States Patent
He

(10) Patent No.: US 9,060,268 B2
(45) Date of Patent: Jun. 16, 2015

(54) NEGOTIATING SECURITY CAPABILITIES DURING MOVEMENT OF UE

(75) Inventor: Chengdong He, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 478 days.

(21) Appl. No.: 12/717,385

(22) Filed: Mar. 4, 2010

(65) Prior Publication Data

US 2010/0159882 A1 Jun. 24, 2010

Related U.S. Application Data

(63) Continuation of application No. PCT/CN2008/072486, filed on Sep. 24, 2008.

(30) Foreign Application Priority Data

Sep. 29, 2007 (CN) .......................... 2007 1 0181068

(51) Int. Cl.
*H04L 29/06* (2006.01)
*H04W 12/04* (2009.01)
(Continued)

(52) U.S. Cl.
CPC .............. *H04W 12/04* (2013.01); *H04L 63/205* (2013.01); *H04W 60/04* (2013.01); *H04W 80/02* (2013.01)

(58) Field of Classification Search
CPC .... H04L 63/205; H04W 12/04; H04W 80/02; H04W 60/04
USPC .......... 713/150–155, 160–176; 380/229–232, 380/247; 726/3, 4, 14, 18, 21
See application file for complete search history.

(56) References Cited

U.S. PATENT DOCUMENTS

| 2002/0066011 A1* | 5/2002 | Vialen et al. .................. 713/150 |
| 2007/0210894 A1* | 9/2007 | Park et al. ...................... 340/5.2 |
| 2008/0014930 A1* | 1/2008 | Jokinen et al. ............. 455/432.3 |

(Continued)

FOREIGN PATENT DOCUMENTS

| CN | 1589060 A | 3/2005 |
| CN | 1795656 A | 6/2006 |

(Continued)

OTHER PUBLICATIONS

3rd Generation Partnership Project; Technical Specification Group Services and System Aspects; Rationale and track of security decisions in Long Term Evolved (Release 8); 3GPP Standard: 3GPP TR 33.821 V0.4.0, Jul. 2007.*

(Continued)

*Primary Examiner* — Taghi Arani
*Assistant Examiner* — Don Zhao
(74) *Attorney, Agent, or Firm* — Leydig, Voit & Mayer, Ltd.

(57) ABSTRACT

A method for negotiating security capabilities during movement of a User Equipment (UE) includes the following steps: a target network entity receives a Routing Area Update (RAU) Request from the UE; the entity obtains Authentication Vector (AV)-related keys deduced according to a root key, and sends the selected security algorithm to the UE; and the UE deduces the AV-related keys according to the root key of the UE. A system, SGSN, and MME for negotiating security capabilities during movement of a UE are also disclosed. The present invention is applicable to security capability negotiation between the UE and the network.

3 Claims, 9 Drawing Sheets

(51) Int. Cl.
    *H04W 60/04*     (2009.01)
    *H04W 80/02*     (2009.01)

(56) References Cited

U.S. PATENT DOCUMENTS

| | | | | |
|---|---|---|---|---|
| 2008/0102896 | A1* | 5/2008 | Wang et al. | 455/560 |
| 2008/0184032 | A1* | 7/2008 | Li et al. | 713/171 |
| 2009/0025060 | A1* | 1/2009 | Mukherjee et al. | 726/3 |
| 2009/0221306 | A1* | 9/2009 | Jacobsohn et al. | 455/458 |

FOREIGN PATENT DOCUMENTS

| | | |
|---|---|---|
| CN | 1953374 A | 4/2007 |
| EP | 1282321 B1 | 2/2005 |

OTHER PUBLICATIONS

3rd Generation Partnership Project; Technical Specification Group Services and System Aspects; GPRS enhancements for E-UTRAN access (Release 8); 3GPP Standard: 3GPP TS 23.401 V1.1.0, Jul. 2007.*

Cover Page of Issued Parent Chinese Patent No. 101399767B, Item (56) citing prior art, granted on Apr. 20, 2011, 1 page total.

Written Opinion of PCT Patent Application No. PCT/CN2008/072486, mailed Jan. 8, 2009, 4 pages total.

3GPP, 3GPP TS 23.401 V1.10 Technical Specification: 3rd Generation Partnership Project; Technical Specification Group Services and System Aspects; GPRS Enhancements for E-UTRAN Access (Release 8), Jul. 2007, XP50363812A1, 78 pages total.

3GPP, "3GPP TS 23.060 V7.4.0 Technical Specification:"3rd Generation Partnership Project; Technical Specification Group Services and System Aspects; General Packet Radio Service (GPRS); Service Description; Stage 2 (Release 7), XP50362315A1, Mar. 2007, 216 pages total.

3GPP, 3GPP TR 33.821 V0.40 Technical Report: 3rd Generation Partnership Project; Technical Specification Group Services and System Aspects; Rationale and track of security decisions in Long Term Evolved (LTE) Ran/3GPP System Architecture Evolution (SAE) (Release 8) ,XP50280077A1, Jul. 2007, 94 pages total.

Nokia, Siemens Networks, "Pseudo-Change Request to TR 33.821: Update of sections 7.4.11 and 7.4.12 on active and idle mode mobility of user-related keys in SAE/LTE", SGPP TSG SA WGS Security—SA3#46b Sophia Antipolis, France, Mar. 28-29, 2007, XP50279461A1, 5 pages total.

Supplementary Search Report in corresponding European Patent Application No. 08800967.5, mailed on Mar. 24, 2011, 8 pages total.

\* cited by examiner

NEGOTIATING SECURITY CAPABILITIES DURING MOVEMENT OF UE

CROSS-REFERENCE TO RELATED APPLICATIONS

This application is a continuation of International Application No. PCT/CN2008/072486, filed on Sep. 24, 2008, which claims priority to Chinese Patent Application No. 200710181068.4, filed on Sep. 29, 2007, both of which are hereby incorporated by reference in their entireties.

FIELD OF THE INVENTION

The present invention relates to communication technologies, and in particular, to a method, system, and apparatus for negotiating security capabilities during movement of a User Equipment (UE).

BACKGROUND OF THE INVENTION

A radio network includes two parts: radio access network and core network. A Long Term Evolution (LTE) radio core network includes a Mobility Management Entity (MME), which implements mobility management and user authentication like a Serving GPRS Support Node (SGSN) in a 2G/3G network. When the UE is idle in the 2G/3G network or the LTE network, the UE needs to negotiate Non-Access Stratum (NAS) security capabilities with the SGSN or MME to ensure normal receiving of the signaling and the security of the communication system.

When the UE in an idle state that accesses the network through an LTE radio access network, the UE may move to a routing area of a 2G GSM Edge Radio Access Network (GERAN) or a 3G UMTS Terrestrial Radio Access Network (UTRAN), and may access the access network through the 2G/3G network again. In this case, Routing Area Update (RAU) between Radio Access Technologies (inter-RAT) occurs; that is, an RAU process between heterogeneous networks occurs. In this process, the entity for negotiating security capabilities for the UE changes, for example, from an MME to an SGSN. The security capabilities of such entities are not necessarily the same. Therefore, it is necessary to perform the security capability negotiation process again to ensure security in the interaction between the UE and the network in the subsequent process.

When the UE moves from an LTE network to a UTRAN network, the RAU process involves negotiation of the ciphering algorithm and the integrity protection algorithm between the UE and the Radio Network Controller (RNC), and negotiation of the ciphering key and the integrity protection key.

When the UE moves from an LTE network to a GERAN network, the RAU process involves negotiation of the ciphering algorithm and the ciphering key between the UE and the 2G SGSN.

The prior art provides no method for negotiating security capabilities in the RAU process between heterogeneous networks. Therefore, when the UE moves from an LTE network to a 2G/3G network, the security capability negotiation is not supported, and the security is not ensured in the subsequent interaction between the UE and the network.

SUMMARY OF THE INVENTION

The embodiments of the present invention provide a method for negotiating security capabilities during movement of a UE, so that the security capabilities can be negotiated when the UE in the idle state moves from an LTE network to a 2G/3G network.

The embodiments of the present invention provide a system for negotiating security capabilities during movement of a UE, so that the security capabilities can be negotiated when the UE in the idle state moves from an LTE network to a 2G/3G network.

The embodiments of the present invention provide an SGSN which obtains Authentication Vector (AV)-related keys when an UE in the idle state moves from an LTE network to a 2G/3G network.

The embodiments of the present invention provide an MME which sends AV-related keys to the 2G/3G network when an UE in the idle state moves from an LTE network to a 2G/3G network.

The technical solution of the present invention is implemented in the following way:

A method for negotiating security capabilities during movement of a UE is provided. When the UE moves from an LTE network to a 2G/3G network, the method includes:

by a target network entity, receiving an RAU Request message sent by the UE, obtaining the security capabilities supported by the UE, and obtaining AV-related keys deduced according to a root key;

selecting a security algorithm according to the security capabilities supported by the UE and sending the selected security algorithm to the UE; and deducing, by the UE, the AV-related keys according to the root key of the UE.

A system for negotiating security capabilities during movement of a UE is provided. The system includes a UE and a target network entity.

The UE is adapted to: send an RAU Request message to the target network entity when the UE moves from an LTE network to a 2G/3G network, receive a selected security algorithm sent by the target network entity, and deduce AV-related keys according to a root key of the UE.

The target network entity is adapted to: receive the RAU Request message sent by the UE, obtain the security capabilities supported by the UE and the AV-related keys deduced according to the root key, select a security algorithm according to the security capabilities supported by the UE, and send the selected security algorithm to the UE.

An SGSN is provided, which is applicable when a UE moves from an LTE network to a 2G/3G network. The SGSN includes a key obtaining module.

The key obtaining module is adapted to: obtain a root key in a mobility management context response received from an MME and deduce AV-related keys according to the root key; or obtain the AV-related keys in the mobility management context response from the MME, where the AV-related keys are deduced by the MME according to the root key of the MME.

An MME is provided, which is applicable when a UE moves from an LTE network to a 2G/3G network. The MME includes a key deducing module and a sending module.

The key deducing module is adapted to deduce AV-related keys according to a root key after receiving a mobility management context request sent by an SGSN.

The sending module is adapted to send the AV-related keys obtained by the key deducing module to the SGSN through a mobility management context response.

Compared with the prior art, the technical solution of the present invention brings the following benefits: When the UE moves from an LTE network to a 2G/3G network, the target network entity receives the RAU Request sent by the UE, and obtains the security capabilities supported by the UE and the AV-related keys deduced according to the root key; the UE deduces the AV-related keys according to the root key of the UE, thus implementing key negotiation of the security capability negotiation; the target network entity selects a security algorithm according to the security capabilities supported by the UE, and sends the selected security algorithm to the UE, thus implementing security algorithm negotiation of the security capability negotiation. Therefore, when the UE moves from an LTE network to a 2G/3G network, the UE can negotiate security capabilities with the network, thus ensuring security in the subsequent interaction between the UE and the network.

DETAILED DESCRIPTION OF THE EMBODIMENTS

The present invention is detailed below with reference to accompanying drawings and exemplary embodiments.

In the method for negotiating security capabilities during movement of a UE, when the UE moves from an LTE network (source network) to a 2G/3G network (target network), the target network entity receives the RAU Request sent by the UE, and obtains the security capabilities supported by the UE and the AV-related keys deduced according to the root key; a security algorithm is selected according to the security capabilities supported by the UE, and the selected security algorithm is sent to the UE; the UE deduces the AV-related keys according to the root key of the UE.

The first, second, and third embodiments give details of the process of negotiating security capabilities when the UE moves from an LTE network to a 3G network. After the UE in the idle state accesses the LTE network, the UE moves from the LTE network to the 3G network, which triggers a process of negotiating security capabilities. The target network entities are a 3G SGSN and an RNC.

First Embodiment

In this embodiment, the 3G SGSN obtains the AV-related keys from the MME directly, where the AV-related keys are deduced according to the root key.

Figure 1:
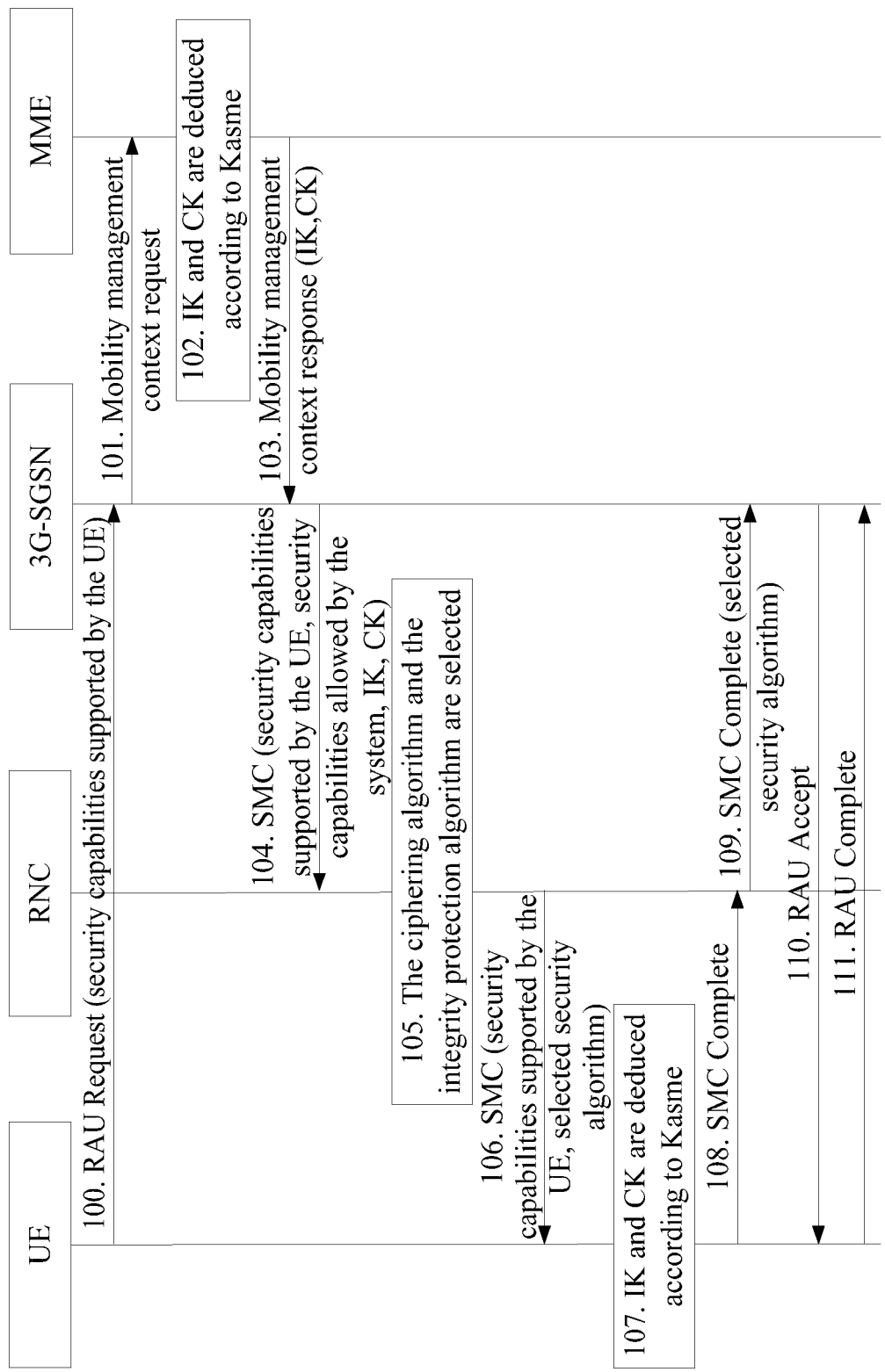
FIG. 1 is a flowchart of a method for negotiating security capabilities during movement of a UE according to a first embodiment of the present invention.

FIG. 1 is a flowchart of a method for negotiating security capabilities during movement of a UE according to the first embodiment of the present invention. As shown in FIG. 1, the method includes the following steps:

Step 100: The UE sends an RAU Request to the 3G SGSN through an RNC.

The RAU Request sent by the UE to the 3G SGSN in this step not only carries the parameters well known to those skilled in the art, for example, Temporary Mobile Subscriber Identifier (TMSI), but also may carries the security capabilities supported by the UE, for example, a ciphering algorithm and/or an integrity protection algorithm.

Steps 101-103: The 3G SGSN obtains the AV-related keys from the MME through a mobility management context message, where the AV-related keys are deduced according to the root key.

Specifically, the 3G SGSN sends a mobility management context request to the MME. The MME deduces the AV-related keys through a unidirectional transformation function according to its own root key Kasme, where the AV-related keys include an integrity protection key IK and a ciphering key CK, or an IK' and a CK' further derived from the IK and the CK through unidirectional transformation by the MME; then the MME returns a mobility management context response that carries the AV-related keys to the 3G SGSN; and the 3G SGSN uses the AV-related keys as the current ciphering key and integrity protection key.

In step 100, if the RAU Request sent by the UE to the 3G SGSN carries no security capabilities supported by the UE, the mobility management context response returned by the MME to the 3G SGSN in step 103 needs to further carry the security capabilities supported by the UE.

A unidirectional transformation process transforms a source parameter to a target parameter through an algorithm, but cannot transform the target parameter back to the source parameter. For example, a CK is obtained through the algorithm f(Kasme), but it is not possible to deduce the Kasme from the CK through any inverse algorithm, which is known as unidirectional transformation.

Steps 104-106: The 3G SGSN sends a Security Mode Command (SMC) message to the RNC. The message carries the security capabilities supported by the UE, security capabilities allowed by the system, and a security key. According to the security capabilities supported by the UE, the security capabilities allowed by the system, and the security capabilities supported by the RNC, the RNC selects security algorithms, including a ciphering algorithm and an integrity protection algorithm, and then sends an SMC message that carries the security capabilities supported by the UE and the selected security algorithm to the UE.

The SMC message may also be carried in the RAU Accept message.

Steps 107-109: The UE deduces the AV-related keys according to its own root key, where the AV-related keys include IK and CK, or an IK' and a CK' further derived from the IK and the CK through unidirectional transformation, and uses them as the current ciphering key and integrity protection key respectively. According to the security capabilities supported by the UE from the RNC and the security capabilities stored in the UE, the UE judges whether any bidding down attack exists, and then sends an SMC Complete message to the RNC. The RNC sends an SMC Complete message that carries the selected security algorithm to the 3G SGSN.

The SMC Complete message may also be carried in an RAU Complete message.

Steps 110-111: The 3G SGSN sends an RAU Accept message to the UE. After receiving the message, the UE returns an RAU Complete message to the 3G SGSN.

Second Embodiment

In this embodiment, the 3G SGSN obtains a root key from the MME, and then deduces AV-related keys according to the root key.

Figure 2:
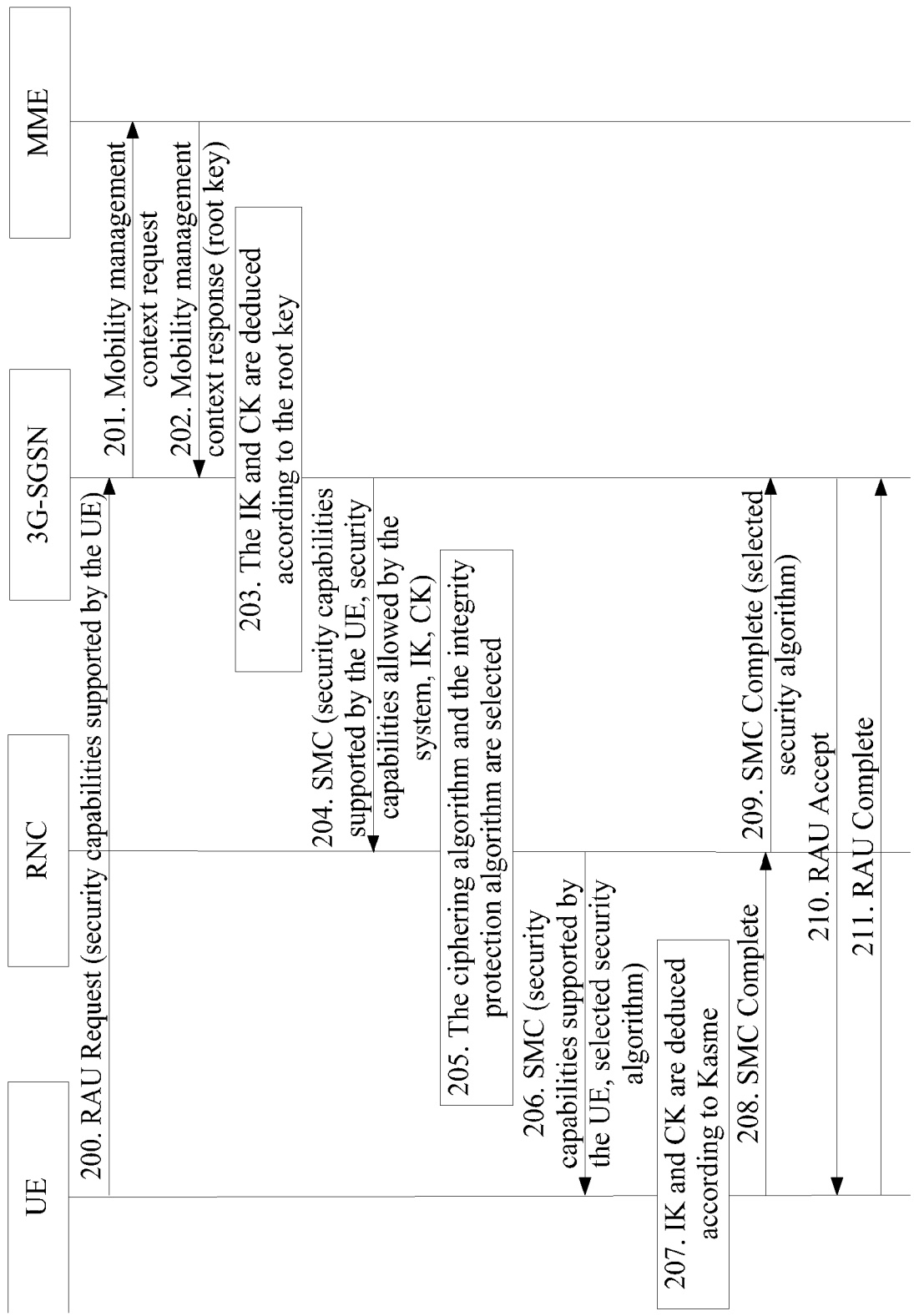
FIG. 2 is a flowchart of a method for negotiating security capabilities during movement of a UE according to a second embodiment of the present invention.

FIG. 2 is a flowchart of a method for negotiating security capabilities during movement of a UE according to the second embodiment of the present invention. As shown in FIG. 2, the method includes the following steps:

Step 200: The UE sends an RAU Request to the 3G SGSN through an RNC.

The RAU Request sent by the UE to the 3G SGSN in this step not only carries the parameters well known to those skilled in the art, for example, TMSI, but also may carries the security capabilities supported by the UE, for example, a ciphering algorithm and/or an integrity protection algorithm.

Steps 201-203: The 3G SGSN obtains the root key from the MME through a mobility management context message, and then deduces the AV-related keys according to the root key.

Specifically, the 3G SGSN sends a mobility management context request to the MME. The MME returns a mobility management context response that carries the root key to the 3G SGSN. The 3G SGSN deduces the AV-related keys through a unidirectional transformation function according to the root key Kasme in the response, where the AV-related keys include an integrity protection key IK and a ciphering key CK, or an IK' and a CK' further derived from the IK and the CK through unidirectional transformation by the 3G SGSN, and uses them as the current ciphering key and integrity protection key respectively.

In step 200, if the RAU request sent by the UE to the 3G SGSN carries no security capabilities supported by the UE, the mobility management context response returned by the MME to the 3G SGSN in step 203 needs to further carry the security capabilities supported by the UE.

Steps 204-206: The 3G SGSN sends an SMC message to the RNC. The message carries the security capabilities supported by the UE, security capabilities allowed by the system, and a security key. According to the security capabilities supported by the UE, the security capabilities allowed by the system, and the security capabilities supported by the RNC, the RNC selects security algorithms, including a ciphering algorithm and an integrity protection algorithm, and then sends an SMC message that carries the security capabilities supported by the UE and the selected security algorithm to the UE.

The SMC message may also be carried in the RAU Accept message.

Steps 207-209: The UE deduces the AV-related keys (including IK and CK) according to its own root key, where the AV-related keys include IK and CK, or an IK' and a CK' further derived from the IK and the CK through unidirectional transformation, and uses them as the current ciphering key and integrity protection key respectively. According to the security capabilities supported by the UE from the RNC and the security capabilities stored in the UE, the UE judges whether any bidding down attack exists, and then sends an SMC Complete message to the RNC. The RNC sends an SMC Complete message that carries the selected security algorithm to the 3G SGSN.

The SMC Complete message may also be carried in an RAU Complete message.

Steps 210-211: The 3G SGSN sends an RAU Accept message to the UE. After receiving the message, the UE returns an RAU Complete message to the 3G SGSN.

Third Embodiment

In this embodiment, the UE of the 3G SGSN obtains the AV-related keys through an Authentication and Key Agreement (AKA) process.

Figure 3:
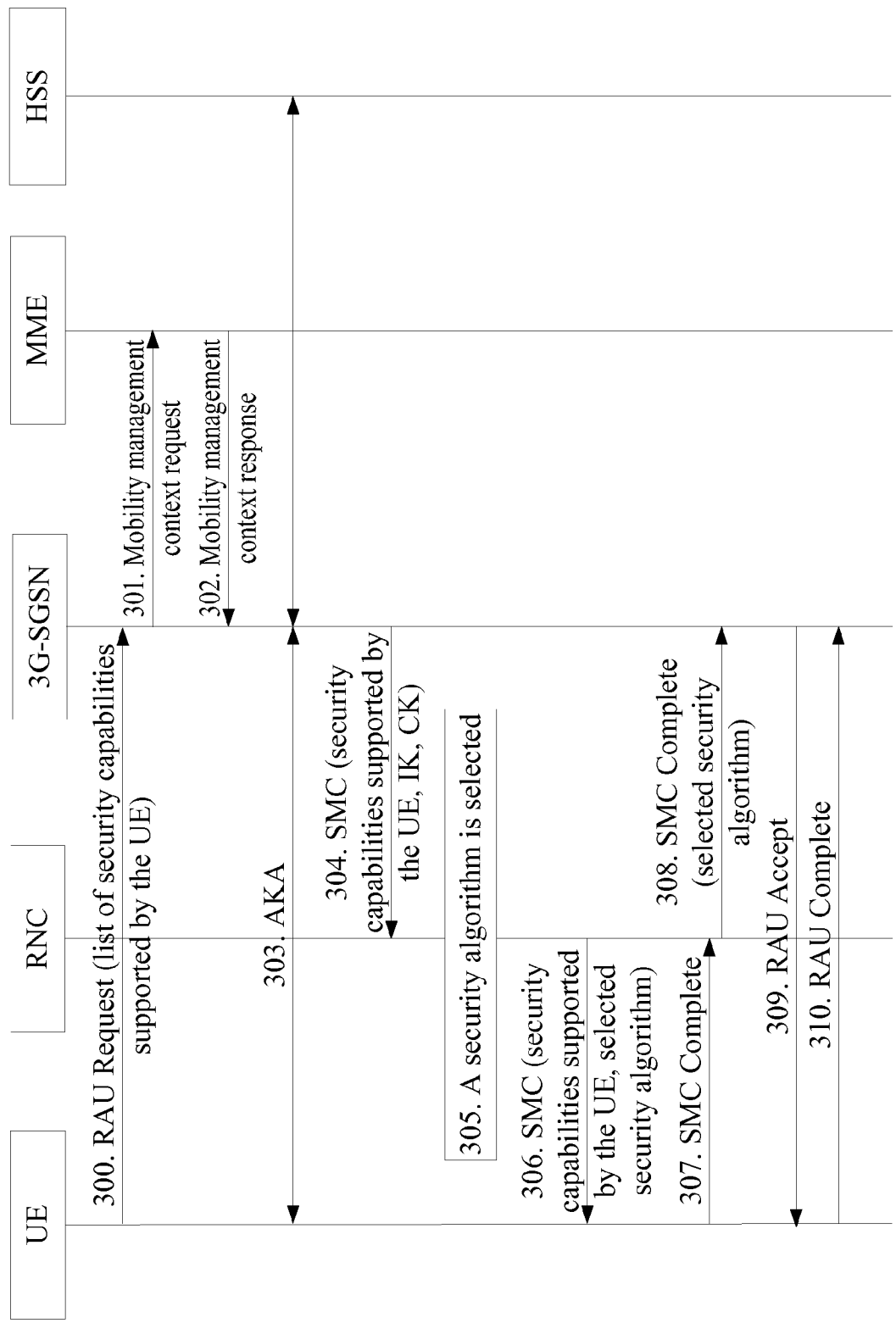
FIG. 3 is a flowchart of a method for negotiating security capabilities during movement of a UE according to a third embodiment of the present invention.

FIG. 3 is a flowchart of a method for negotiating security capabilities during movement of a UE according to the third embodiment of the present invention. As shown in FIG. 3, the method includes the following steps:

Step 300: The UE sends an RAU Request to the 3G SGSN through an RNC.

Steps 301-302: The 3G SGSN obtains the mobility management context from the MME through a mobility management context message.

In step 300, if the RAU Request sent by the UE to the 3G SGSN carries no security capabilities supported by the UE, the mobility management context response returned by the MME to the 3G SGSN in step 302 needs to further carry the security capabilities supported by the UE.

Step 303: Through an AKA process, the 3G SGSN and the UE obtain the AV-related keys (IK and CK) from a Home Subscriber Server (HSS).

Steps 304-306: The 3G SGSN sends an SMC message to the RNC. The message carries the security capabilities supported by the UE, security capabilities allowed by the system, and a security key. According to the security capabilities supported by the UE, the security capabilities allowed by the system, and the security capabilities supported by the RNC, the RNC selects security algorithms, including a ciphering algorithm and an integrity protection algorithm, and then sends an SMC message that carries the security capabilities supported by the UE and the selected security algorithm to the UE.

The SMC message may also be carried in the RAU Accept message.

Steps 307-310 are the same as steps 108-111, and thus are not repeatedly described.

The fourth, fifth, and sixth embodiments give details of the process of negotiating security capabilities when the UE moves from an LTE network to a 2G network. After the UE in the idle state accesses the LTE network, the UE moves from the LTE network to the 2G network, which triggers a process of negotiating security capabilities. The target network entity is a 2G SGSN.

Fourth Embodiment

In this embodiment, the 2G SGSN obtains the AV-related keys from the MME directly, where the AV-related keys are deduced according to the root key.

Figure 4:
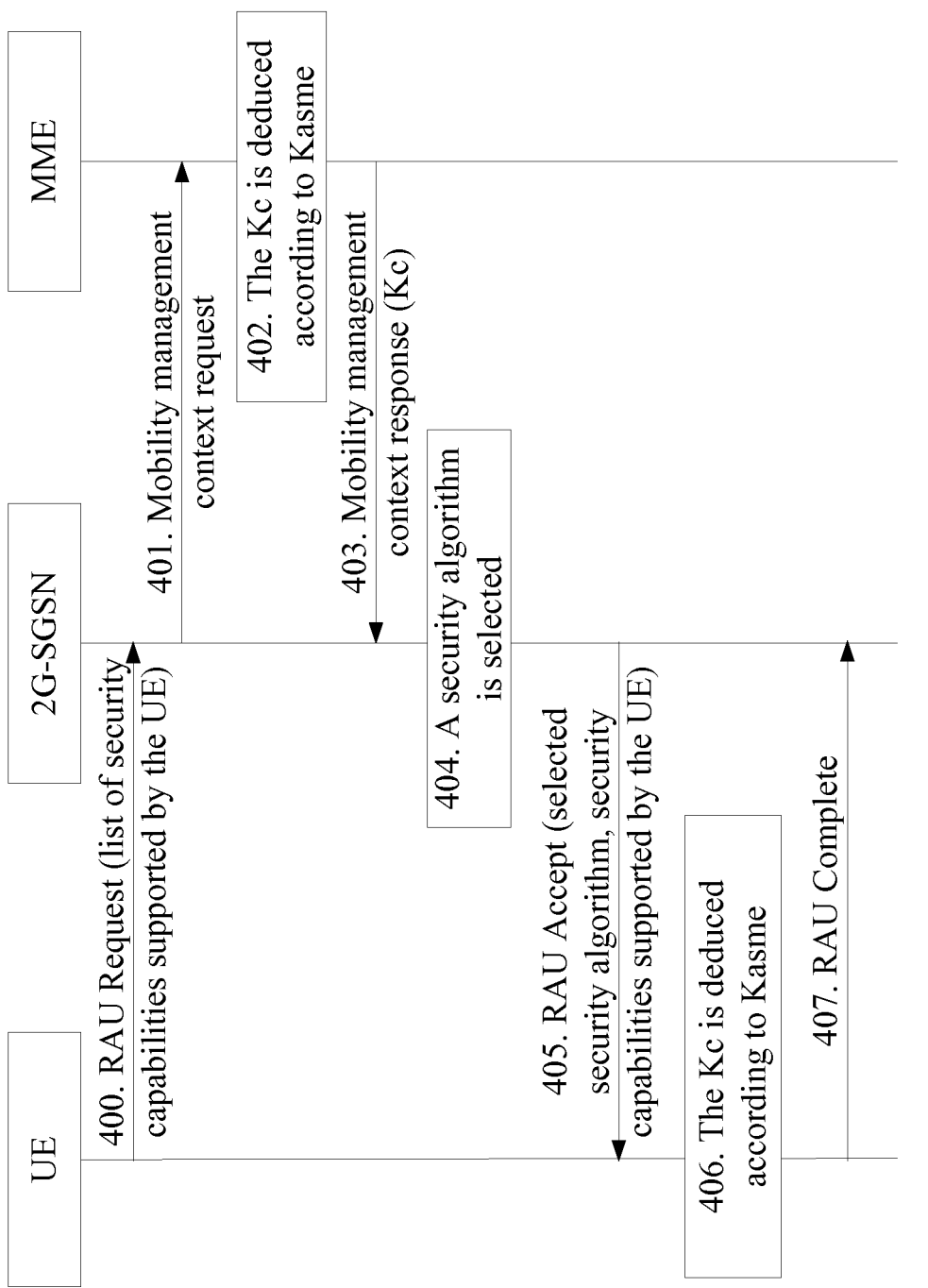
FIG. 4 is a flowchart of a method for negotiating security capabilities during movement of a UE according to a fourth embodiment of the present invention.

FIG. 4 is a flowchart of a method for negotiating security capabilities during movement of a UE according to the fourth embodiment of the present invention. As shown in FIG. 4, the method includes the following steps:

Step 400: The UE sends an RAU Request to the 2G SGSN.

The RAU Request sent by the UE to the 2G SGSN in this step not only carries the parameters well known to those skilled in the art, for example, TMSI, but also may carries the security capabilities supported by the UE, for example, a ciphering algorithm and/or an integrity protection algorithm.

In this step, the UE sends an RAU Request to the 2G SGSN through a Base Station System (BSS). For ease of description below, the communication performed between the UE and the 2G SGSN through a BSS is described briefly as the communication between the UE and the 2G SGSN.

Steps 401-403: The 2G SGSN obtains the AV-related keys from the mobility management context response received from the MME, where the AV-related keys are deduced according to the root key.

Specifically, the 2G SGSN sends a mobility management context request to the MME. The MME deduces the AV-related keys through a unidirectional transformation function according to its own root key Kasme. The AV-related keys include a ciphering key Kc, or Kc' further derived from the Kc through unidirectional transformation by the MME; then the MME returns a mobility management context response that carries the AV-related keys to the 2G SGSN; and the 2G SGSN uses the AV-related keys as the current ciphering key.

In step 400, if the RAU Request sent by the UE to the 2G SGSN carries no security capabilities supported by the UE, the mobility management context response returned by the MME to the 2G SGSN in step 403 needs to further carry the security capabilities supported by the UE.

Steps 404-405: The 2G SGSN selects security algorithms (including a ciphering algorithm) according to the security capabilities supported by the UE, the security capabilities allowed by the system, and the security capabilities supported by the 2G SGSN, and then sends an RAU Accept message to the UE, where the message carries the security capabilities supported by the UE and the selected security algorithm.

Steps 406-407: The UE deduces the AV-related keys according to its own root key, The AV-related keys include a Kc, or a Kc' further derived from the Kc through unidirectional transformation, and uses the AV-related keys as the current ciphering key. According to the security capabilities supported by the UE from the 2G SGSN and the security capabilities stored in the UE, the UE judges whether any bidding down attack exists, and then sends an RAU Complete message to the 2G SGSN.

Fifth Embodiment

In this embodiment, the 2G SGSN obtains a root key from the MME, and then deduces AV-related keys according to the obtained root key.

Figure 5:
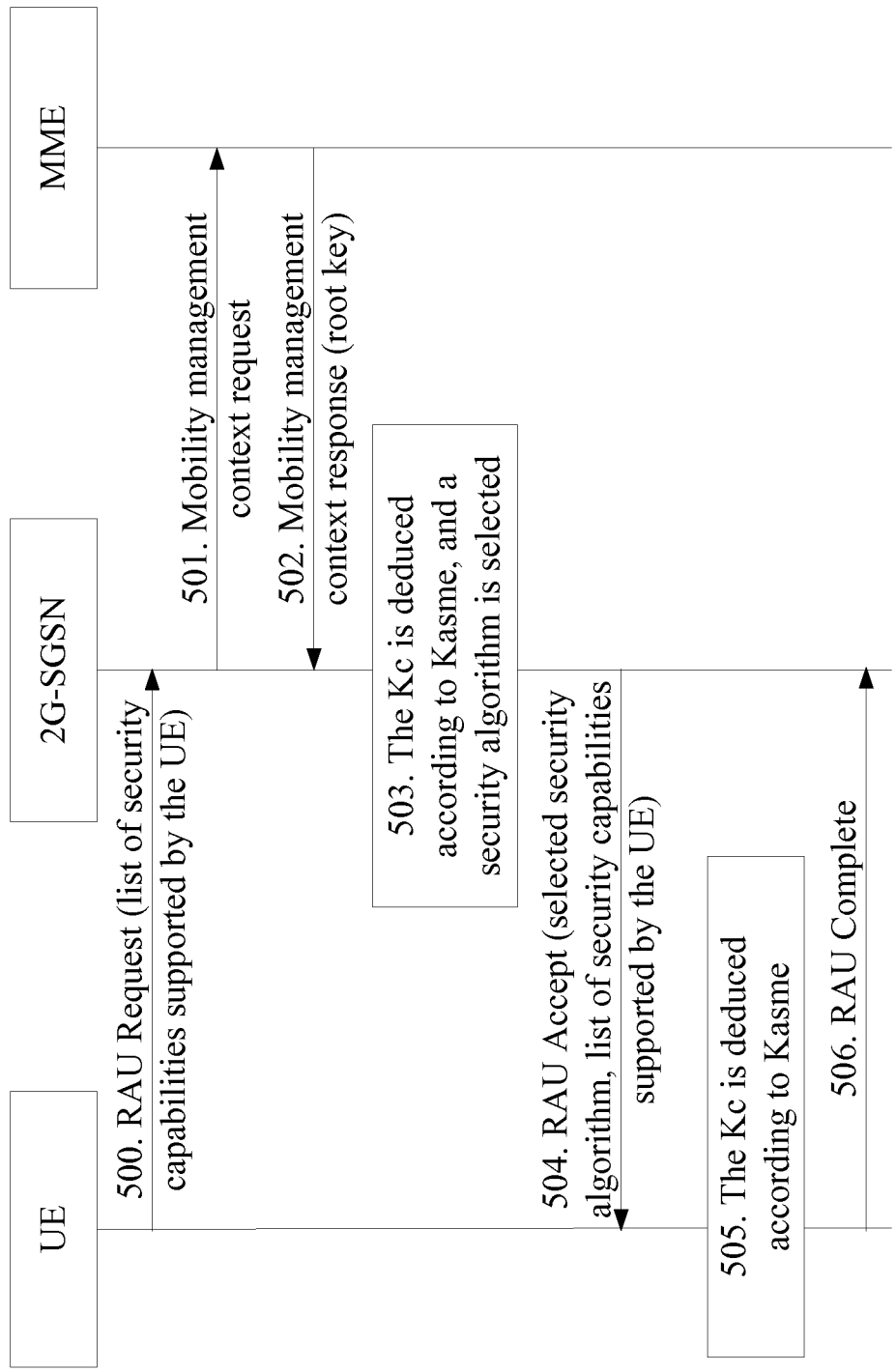
FIG. 5 is a flowchart of a method for negotiating security capabilities during movement of a UE according to a fifth embodiment of the present invention.

FIG. 5 is a flowchart of a method for negotiating security capabilities during movement of a UE according to the fifth embodiment of the present invention. As shown in FIG. 5, the method includes the following steps:

Step 500: The UE sends an RAU Request to the 2G SGSN.

Steps 501-502: The 2G SGSN obtains the root key from the mobility management context response received from the MME.

Specifically, the 2G SGSN sends a mobility management context request to the MME, and the MME returns a mobility management context response that carries the root key to the 2G SGSN.

In step 500, if the RAU Request sent by the UE to the 2G SGSN carries no security capabilities supported by the UE, the mobility management context response returned by the MME to the 2G SGSN in step 502 needs to further carry the security capabilities supported by the UE.

Step 503: The 2G SGSN deduces the AV-related keys according to the obtained root key, and selects security algorithms (including a ciphering algorithm) according to the security capabilities supported by the UE, the security capabilities allowed by the system, and the security capabilities supported by the 2G SGSN.

Steps 504-506 are the same as steps 405-407, and are not repeatedly described.

Sixth Embodiment

In this embodiment, the 2G SGSN obtains the AV-related keys through a 2G re-authentication process.

Figure 6:
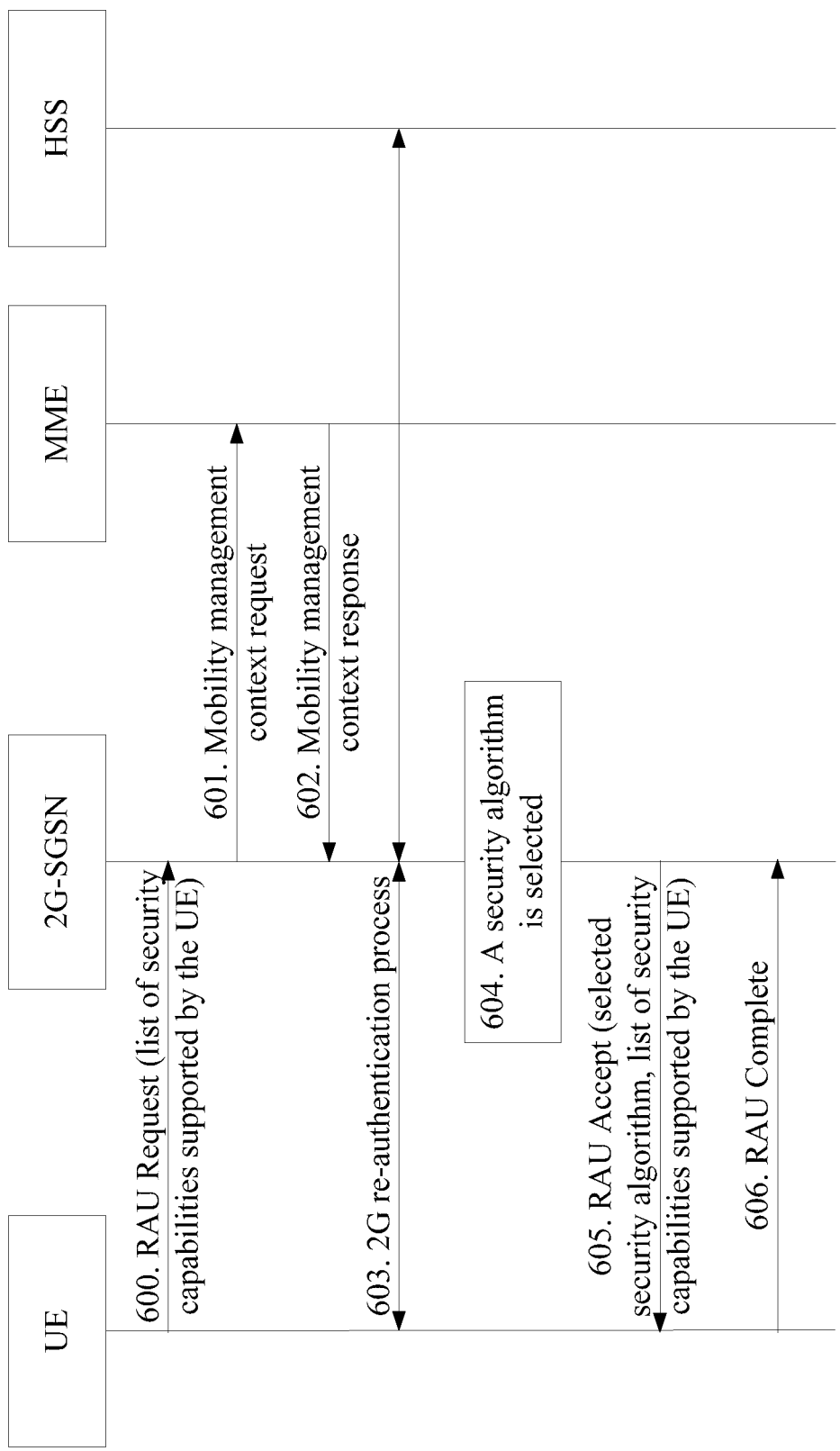
FIG. 6 is a flowchart of a method for negotiating security capabilities during movement of a UE according to a sixth embodiment of the present invention.

FIG. 6 is a flowchart of a method for negotiating security capabilities during movement of a UE according to the sixth embodiment of the present invention. As shown in FIG. 6, the method includes the following steps:

Step 600: The UE sends an RAU Request to the 2G SGSN.

Steps 601-602: The 2G SGSN sends a mobility management context request to the MME, and the MME returns a response that carries the mobility management context to the 2G SGSN.

In step 600, if the RAU Request sent by the UE to the 2G SGSN carries no security capabilities supported by the UE, the mobility management context response returned by the MME to the 2G SGSN in step 602 needs to further carry the security capabilities supported by the UE.

Step 603: The 2G SGSN and the UE obtain the AV-related key (Kc) from the HSS through a 2G re-authentication process.

Steps 604-606: The 2G SGSN selects security algorithms (including a ciphering algorithm) according to the security capabilities supported by the UE, the security capabilities allowed by the system, and the security capabilities supported by the 2G SGSN, and then sends an RAU Accept message to the UE, where the message carries the security capabilities supported by the UE and the selected security algorithm. The UE returns an RAU Complete message to the 2G SGSN.

Figure 7:
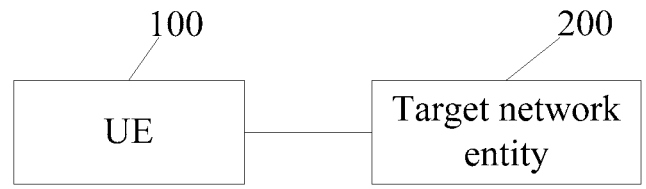
FIG. 7 shows a system for negotiating security capabilities during movement of a UE according to an embodiment of the present invention.

A system for negotiating security capabilities during movement of a UE is provided. As shown in FIG. 7, the system includes a UE 100 and a target network entity 200.

The UE 100 is adapted to: send an RAU Request message to the target network entity 200 when the UE moves from an LTE network to a 2G/3G network, receive a selected security algorithm sent by the target network entity 200, and deduce AV-related keys according to a root key of the UE.

The target network entity 200 is adapted to: receive the RAU Request message sent by the UE 100, obtain the security capabilities supported by the UE 100 and the AV-related keys deduced according to the root key, select a security algorithm according to the security capabilities supported by the UE 100, and send the selected security algorithm to the UE 100.

The seventh and eighth embodiments take a 2G system and a 3G system as examples for negotiating security capabilities during movement of the UE.

Seventh Embodiment

Figure 8:
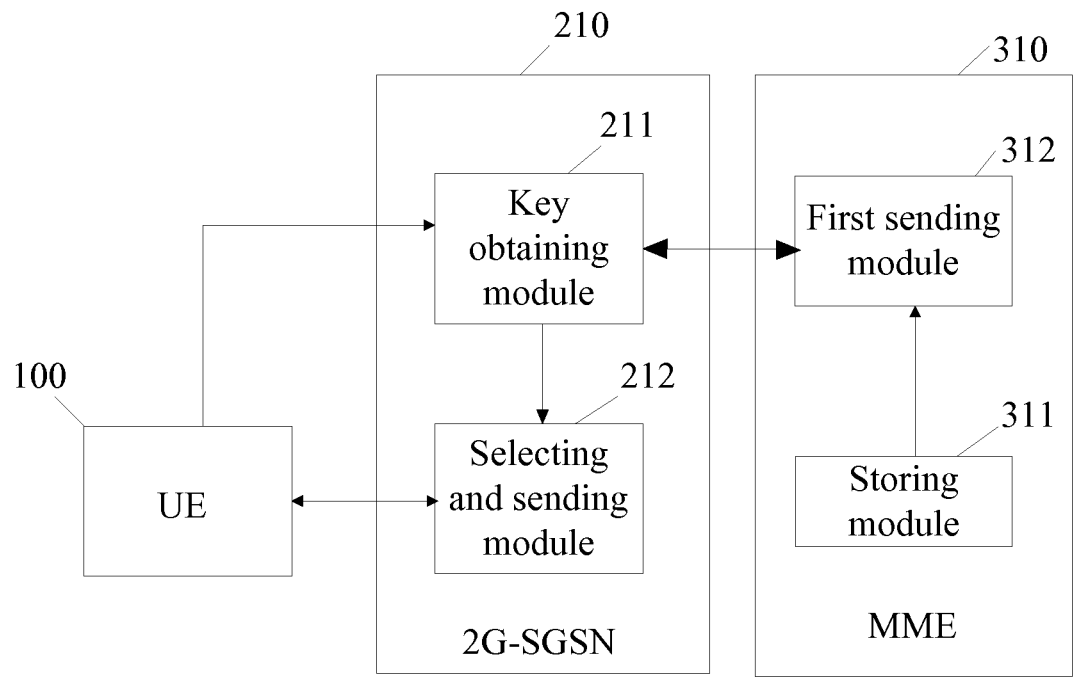
FIG. 8 shows a structure of a 2G system and external connection relations for negotiating security capabilities during movement of a UE according to a seventh embodiment of the present invention.

In a 2G system for negotiating security capabilities during movement of the UE, the target network entity is an SGSN in the 2G network, namely, a 2G SGSN 210. FIG. 8 shows a structure of a 2G system and external connection relations for negotiating security capabilities during movement of a UE according to an embodiment of the present invention. As shown in FIG. 8, the SGSN 210 includes a key obtaining module 211 and a selecting and sending module 212.

The key obtaining module 211 is adapted to: obtain a root key in a mobility management context response from an MME after receiving an RAU Request sent by the UE, and deduce AV-related keys according to the root key.

The selecting and sending module 212 is adapted to: obtain the security capabilities supported by the UE 100, select a security algorithm according to the security capabilities supported by the UE 100, and send the selected security algorithm to the UE 100.

As shown in FIG. 8, the 2G system for negotiating security capabilities during movement of the UE according to this embodiment further includes an MME 310, which is applicable when the UE moves from an LTE network to a 2G/3G network. The MME 310 includes a storing module 311 and a first sending module 312.

The storing module 311 is adapted to store a root key.

The first sending module 312 is adapted to send the root key stored in the storing module 311 to the SGSN through a mobility management context response after receiving the mobility management context request sent by the SGSN.

Alternatively, if the key obtaining module 211 is adapted to obtain the AV-related key from the mobility management context response from the MME, where the AV-related key is deduced by the MME according to the root key of the MME, the MME includes a key deducing module and a second sending module. The key deducing module is adapted to deduce AV-related keys according to a root key after receiving a mobility management context request sent by an SGSN. The second sending module is adapted to send the AV-related keys obtained by the key deducing module to the SGSN through a mobility management context response.

Eighth Embodiment

Figure 9:
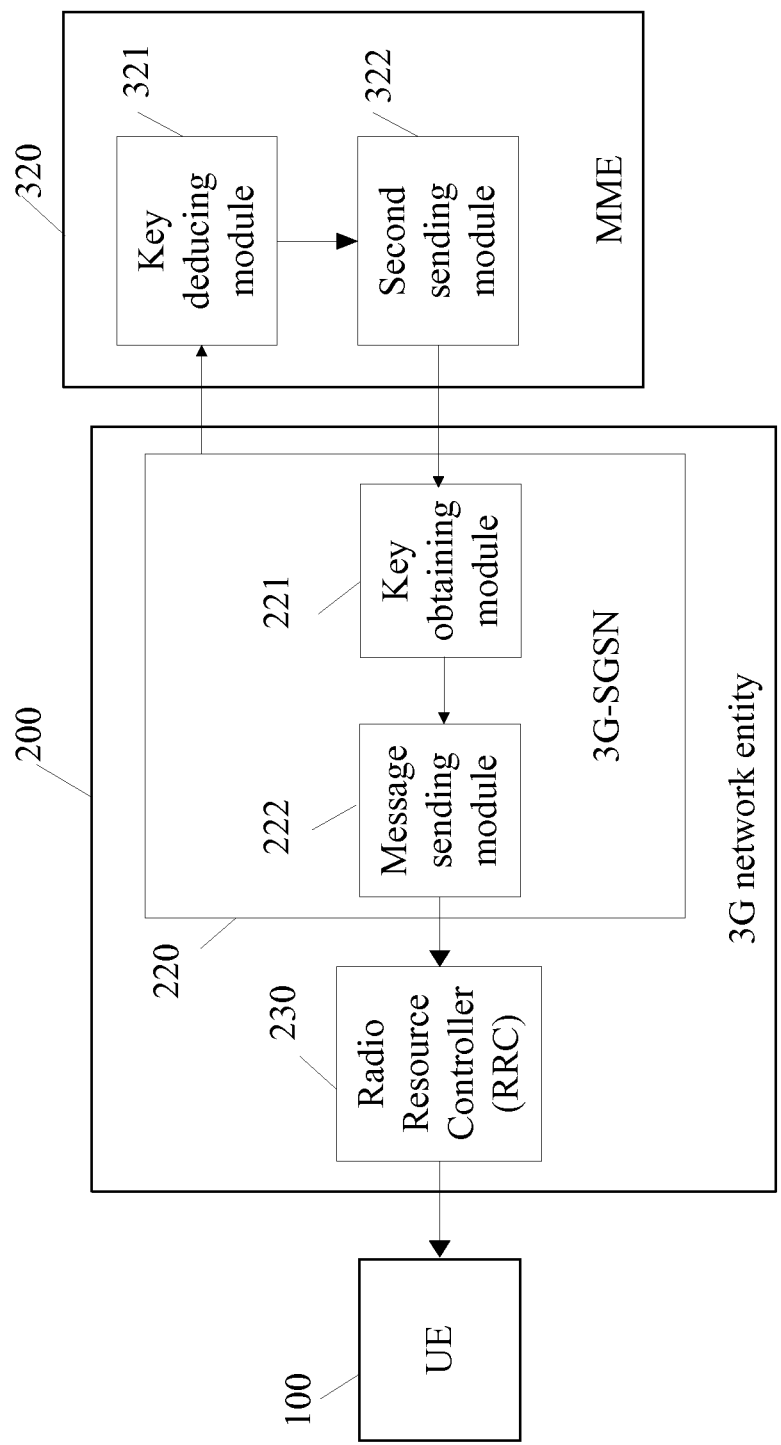
FIG. 9 shows a structure of a 3G system and external connection relations for negotiating security capabilities during movement of a UE according to an eighth embodiment of the present invention.

In the 3G system for negotiating security capabilities during movement of the UE, the target network entities 200 include an SGSN in the 3G network, namely, a 3G SGSN 220, and an RNC 230. FIG. 9 shows a structure of a 3G system and external connection relations for negotiating security capabilities during movement of a UE according to an embodiment of the present invention.

As shown in FIG. 9, the SGSN 220 in the system includes a key obtaining module 221 and a message sending module 222. The key obtaining module 221 is adapted to obtain the AV-related keys from the mobility management context response received from the MME, where the AV-related keys are deduced by the MME according to the root key of the MME. The message sending module 222 is adapted to send an SMC message to the RNC 230 for processing, where the message carries the security capabilities supported by the UE, the security capabilities allowed by the system, and the security key.

Accordingly, the MME 320 in this embodiment includes a key deducing module 321 and a second sending module 322.

The key deducing module 321 is adapted to deduce AV-related keys according to a root key after receiving a mobility management context request sent by an SGSN.

The second sending module 322 is adapted to send the AV-related keys obtained by the key deducing module 321 to the SGSN through a mobility management context response.

As in the seventh embodiment, if the SGSN obtains the root key from the MME directly and deduces the AV-related keys, the MME includes a storing module 311 and a first sending module 312. The storing module 311 is adapted to store a root key. The first sending module 312 is adapted to send the root key stored in the storing module 311 to the SGSN through a mobility management context response after receiving the mobility management context request sent by the SGSN.

An SGSN is provided, which is applicable when a UE moves from an LTE network to a 2G/3G network. The ninth and tenth embodiments deal with the SGSN.

Ninth Embodiment

For the scenario where the UE moves from an LTE network to a 3G network, this embodiment provides an SGSN. The SGSN includes a key obtaining module, which is adapted to: obtain a root key in a mobility management context response received from an MME and deduce AV-related keys according to the root key.

In other embodiments of the present invention, the key obtaining module is adapted to obtain the AV-related keys from the mobility management context response received from the MME, where the AV-related keys are deduced by the MME according to the root key of the MME.

Tenth Embodiment

Figure 10:
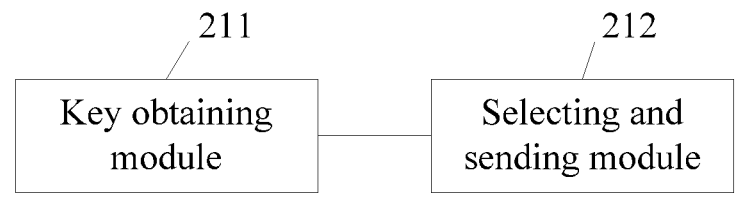
FIG. 10 shows an SGSN according to a tenth embodiment of the present invention.

The SGSN in this embodiment is applicable when the UE moves from an LTE network to a 2G network. As shown in FIG. 10, the SGSN includes a key obtaining module 211 and a selecting and sending module 212.

The key obtaining module 211 is adapted to: obtain a root key in a mobility management context response received from an MME and deduce AV-related keys according to the root key.

The selecting and sending module 212 is adapted to: obtain the security capabilities supported by the UE 100, select a security algorithm according to the security capabilities supported by the UE 100, and send the selected security algorithm to the UE 100.

In other embodiments of the present invention, the key obtaining module is adapted to obtain the AV-related keys from the mobility management context response received from the MME, where the AV-related keys are deduced by the MME according to the root key of the MME.

An MME is provided, which is applicable when a UE moves from an LTE network to a 2G/3G network.

Eleventh Embodiment

Figure 11:
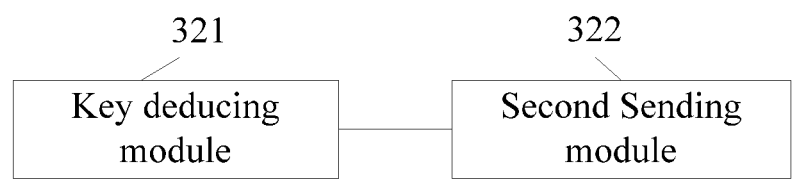
FIG. 11 shows an MME according to an eleventh embodiment of the present invention.

As shown in FIG. 11, if the SGSN obtains the AV-related keys deduced by the MME according to the root key, the MME includes a key deducing module 321 and a second sending module 322. The key deducing module 321 is adapted to deduce AV-related keys according to a root key after receiving a mobility management context request sent by an SGSN. The second sending module 322 is adapted to send the AV-related keys obtained by the key deducing module 321 to the SGSN through a mobility management context response.

In conclusion, through the technical solution of the present invention, when the UE moves from an LTE network to a 2G/3G network, the target network entity receives the RAU Request sent by the UE, and then obtains the security capabilities supported by the UE and the AV-related keys deduced according to the root key; the UE deduces the AV-related keys according to the root key of the UE, thus implementing key negotiation; the target network entity selects a security algorithm according to the security capabilities supported by the UE, and then sends the selected security algorithm to the UE, thus implementing security algorithm negotiation. Therefore, when the UE moves from an LTE network to a 2G/3G network, the UE can negotiate security capabilities with the network, thus ensuring security in the subsequent interaction between the UE and the network.

The serial numbers of the embodiments given above are for clear description only, and do not represent the order of preference. The word "step" does not represent the sequence of performing the method in the embodiments of the present invention.

Described above are only exemplary embodiments of the present invention, but not intended to limit the scope of protection of the present invention.

What is claimed is:

1. In a mobility management entity (MME) of a long term evolution (LTE) network, a method for negotiating security keys comprising:
   receiving a context request for requesting a mobility management context sent by a serving GPRS support node (SGSN) in a second or third generation (2G/3G) network, according to a routing area update (RAU) request from a user equipment (UE) in an idle mode; and
   sending the mobility management context to the SGSN, wherein the mobility management context comprises information for determining security capacities supported by the UE and authentication vector (AV)-related keys that are deduced according to a root key of the MME, wherein the AV-related keys comprise an Integrity Protection Key (IK) and a Ciphering Key (CK), or comprise values derived from the IK and the CK through an unidirectional transformation.

2. A mobility management entity (MME) of a long term evolution (LTE) network for negotiating security keys, comprising:
   a receiver configured to receive a context request for requesting a mobility management context sent by a serving GPRS support node (SGSN) in a second or third generation (2G/3G) network according to a routing area update (RAU) request from a user equipment (UE) in an idle mode;
   a processor configured to deduce authentication vector (AV)-related keys according to a root key of the MME, wherein the AV-related keys comprise an Integrity Protection Key (IK) and a Ciphering Key (CK), or comprise values derived from the IK and the CK through an unidirectional transformation; and
   a transmitter configured to send the mobility management context to the SGSN, wherein the mobility management context comprises information for determining security capacities supported by the UE and the AV-related keys.

3. A system for negotiating security keys, comprising:
   a serving GPRS support node (SGSN) in a second or third generation (2G/3G) network, configured to receive a routing area update (RAU) request from a user equipment (UE) when the UE is in an idle mode and moves from a long term evolution (LTE) network to the 2G/3G network, and to send a context request to a mobility management entity (MME) in the LTE network to request a mobility management context according to the RAU request; and
   the MME configured to receive the context request, and send the mobility management context to the SGSN, wherein the mobility management context comprises information for determining security capacities supported by the UE and authentication vector (AV)-related keys that are deduced according to a root key of the MME, wherein the AV-related keys comprise an Integrity Protection Key (IK) and a Ciphering Key (CK);
   wherein the SGSN is further configured to send the AV-related keys to a radio network controller (RNC).

* * * * *